United States Patent
Andsager

(10) Patent No.: US 6,246,316 B1
(45) Date of Patent: Jun. 12, 2001

(54) TRAILER TIRE PRESSURE-MONITORING SYSTEM

(76) Inventor: Richard L. Andsager, PMB 1900, 6301 S. Squaw Valley Rd., Pahrump, NV (US) 89048-3172

(*) Notice: Subject to any disclaimer, the term of this patent is extended or adjusted under 35 U.S.C. 154(b) by 0 days.

(21) Appl. No.: 09/511,558

(22) Filed: Feb. 23, 2000

(51) Int. Cl.[7] .................................................. B60C 23/02
(52) U.S. Cl. ........................ 340/444; 340/442; 340/443
(58) Field of Search .................................. 340/444, 442, 340/443, 448

(56) References Cited

U.S. PATENT DOCUMENTS

| | | | |
|---|---|---|---|
| 4,119,944 | * 10/1978 | Smith | 340/58 |
| 4,777,611 | * 10/1988 | Tashire et al. | 364/565 |
| 4,807,468 | * 2/1989 | Galan | 73/146.5 |
| 4,816,802 | * 3/1989 | Doerksen et al. | 340/447 |
| 5,541,859 | * 7/1996 | Inoue et al. | 364/565 |
| 5,557,552 | * 9/1996 | Naito et al. | 364/565 |

* cited by examiner

Primary Examiner—Jeffery Hofsass
Assistant Examiner—Son Tang
(74) Attorney, Agent, or Firm—Martin L. Stoneman

(57) ABSTRACT

A tire pressure-monitoring system for use with a trailer. The monitoring system includes an inductive proximity sensor mounted adjacent each wheel. To activate the sensors, a target is mounted on each brake drum. Rotational speed data for each wheel is relayed from each sensor to a programmable logic controller which compares the rotational speed of a wheel with another wheel. Sensitivity parameters written into the program contained in the programmable logic controller compares the input data and, if the data falls outside the safe parameters, alerts the driver by activating and audio or visual alarm mounted within the tow vehicle. The sensitivity of the programmed logic may be optimized to differentiate changes in a tire diameter due to turning versus an actual loss in tire pressure.

31 Claims, 4 Drawing Sheets

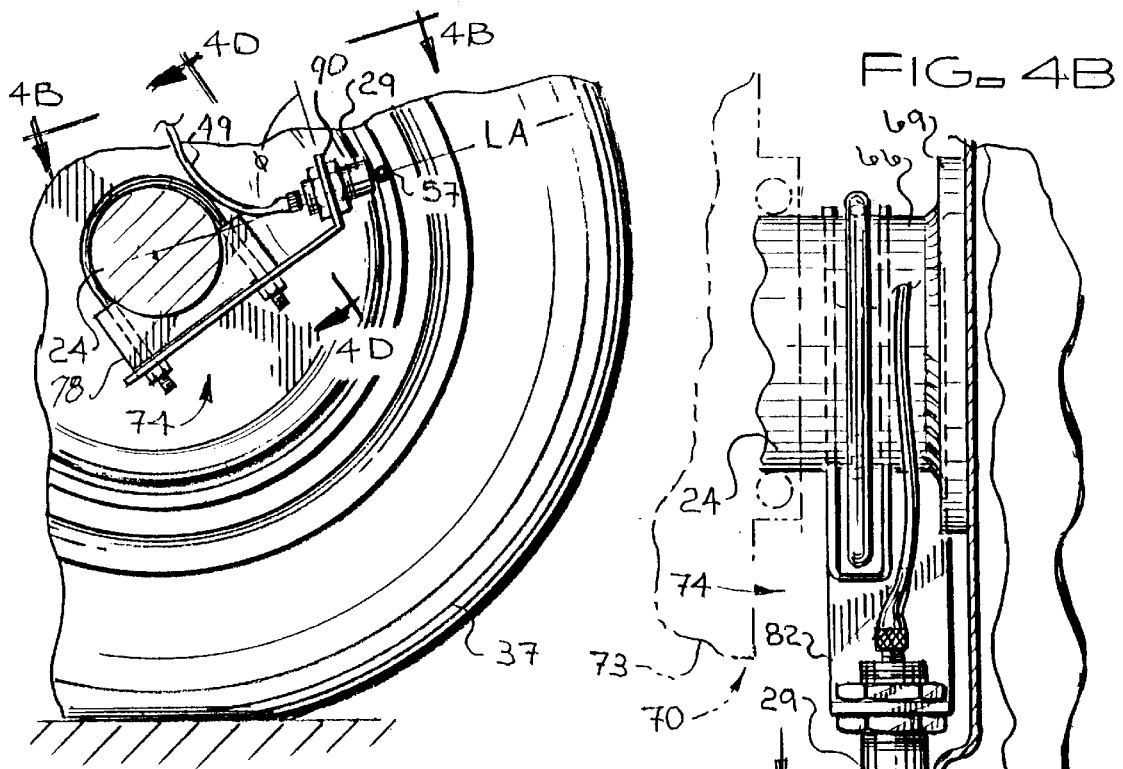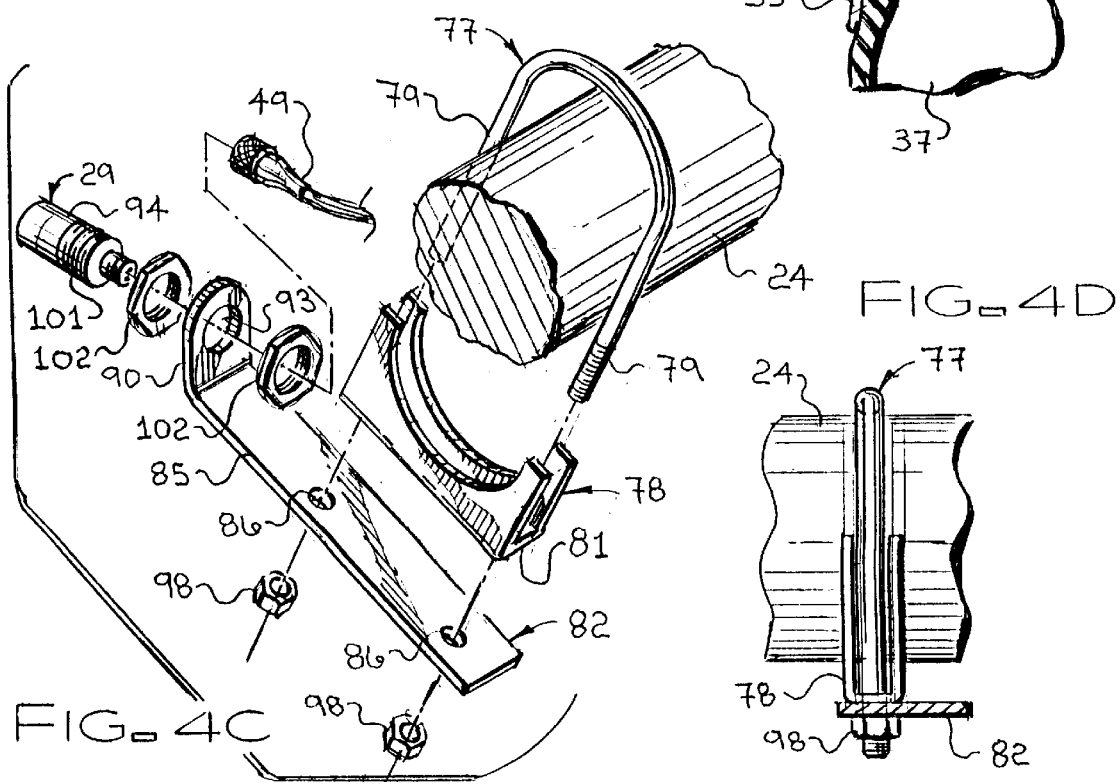

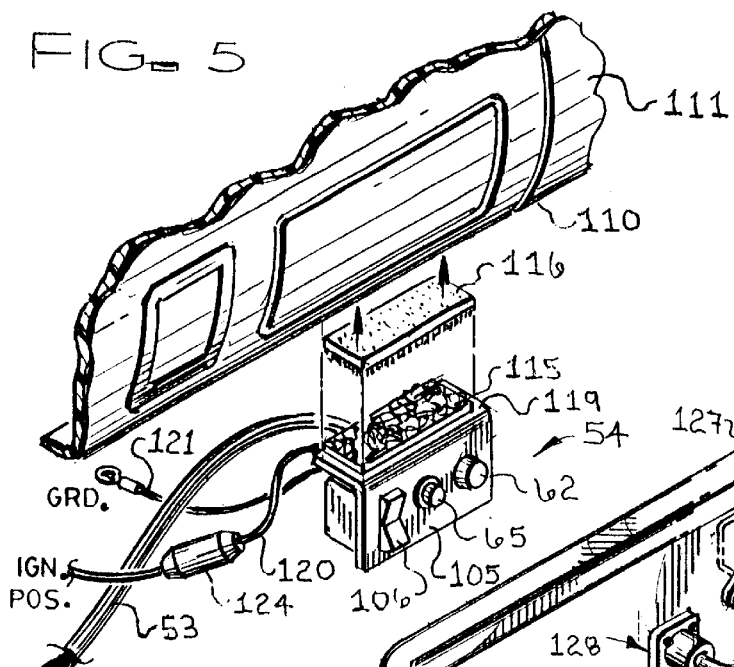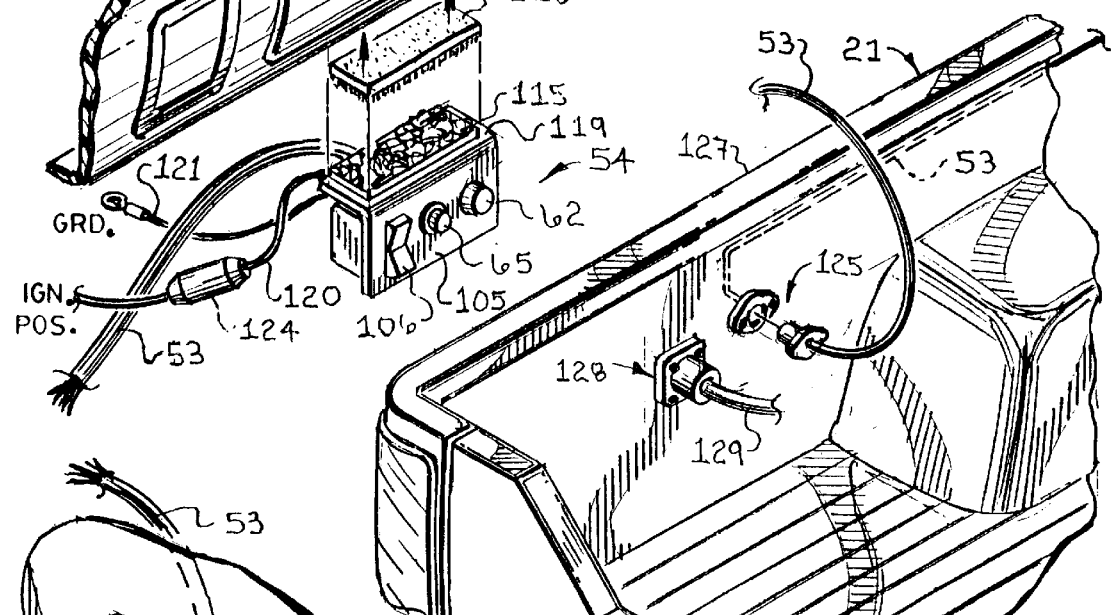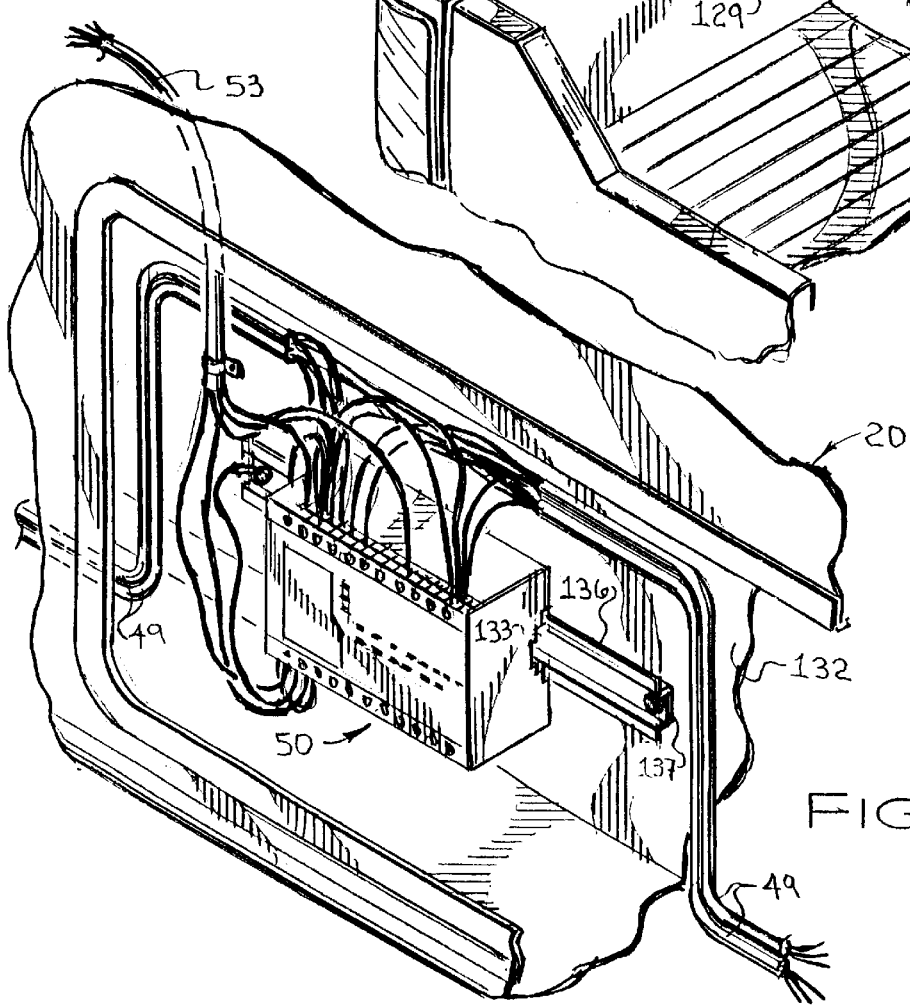

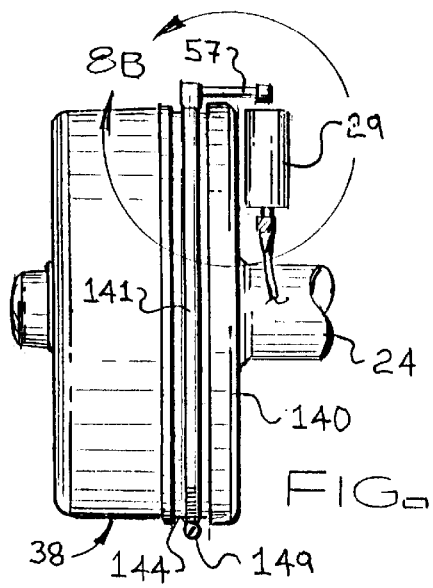
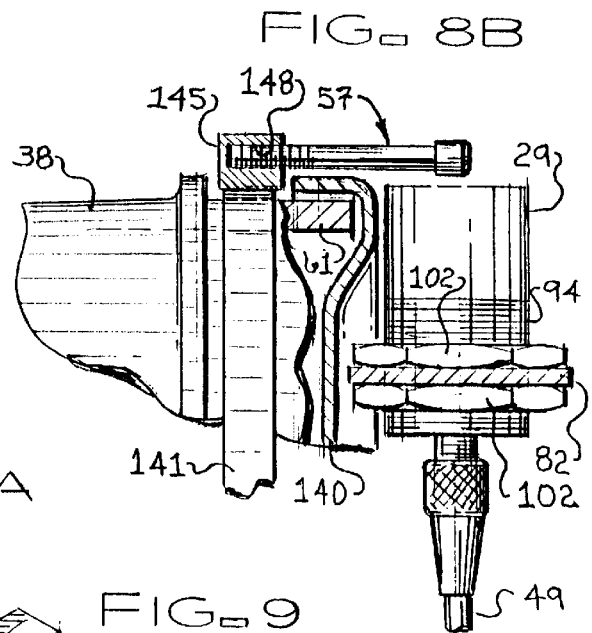
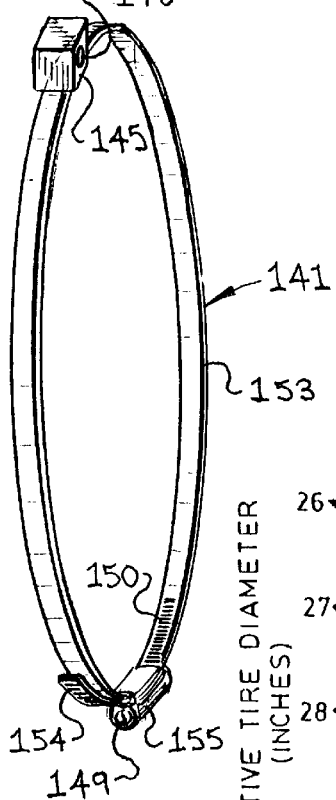
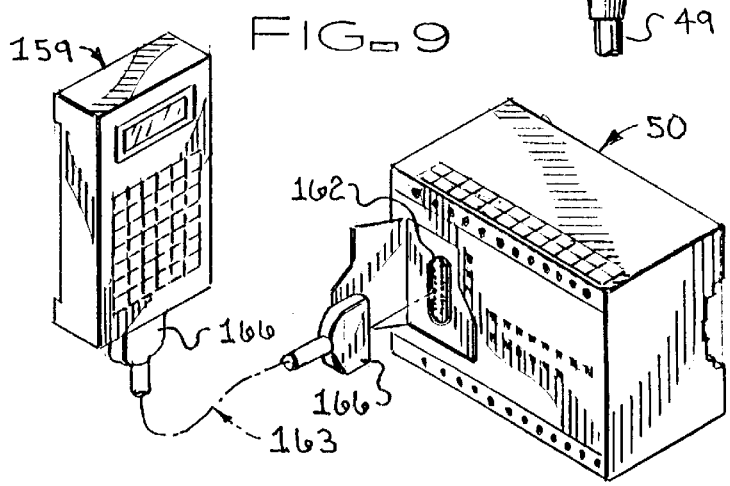
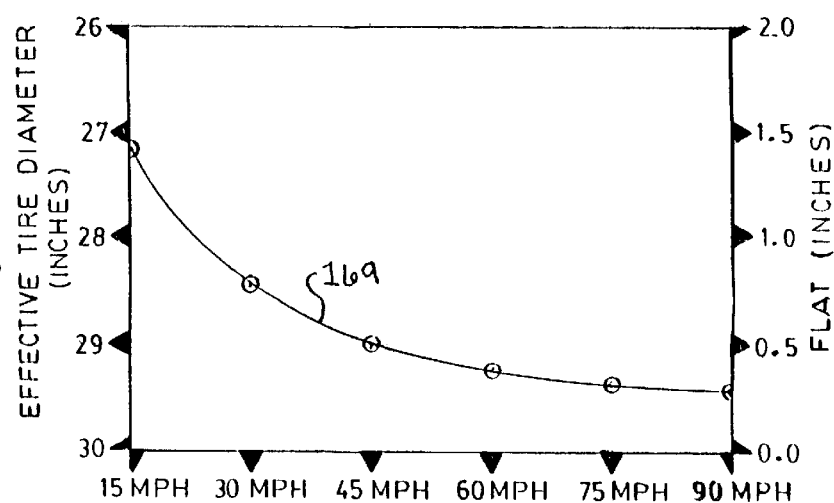

TRAILER TIRE PRESSURE-MONITORING SYSTEM

BACKGROUND OF THE INVENTION

1. Field of the Invention

This invention relates to providing a trailer tire pressure monitoring system. More particularly, this invention concerns a trailer tire pressure monitoring system for warning the driver of a deflating tire on a trailer prior to tire failure. In addition, this invention concerns the provision of a tire pressure monitoring system which is capable of detecting a deflated tire by comparing the rotational speed of several tires.

2. Description of the Prior Art

Typically, vehicle-coupled trailers are used to transport an assortment of cargos such as, for example, goods, livestock, and transient living quarters. Oftentimes, the driver of the towing vehicle will be unaware of the occurrence of air pressure loss in one or more of the trailers tires until it is too late and the tire fails. For single axle trailers comprising only one tire on each side of the trailer, a failure in a single tire may lead to catastrophic consequences, such as trailer rollover or jackknifing, which may not only damage the contents of the trailer but also produce a traffic hazard to other motorists. Even for those single-axle trailers having dual wheels per trailer side, or multi-axle trailers comprising multiple wheels on each side of the trailer, a single tire failure can still result in damage to the trailer as well as collateral damage to other motorists caused by flying tire debris. With these concerns in mind, if a device were utilized to alert the driver of a possible hazardous tire condition, preventive measures may be taken in time to minimize damage to not only the affected tire but also to the remaining trailer components, the trailer body, the tow vehicle, and the general public sharing the road.

The current methods of detecting when a potentially abnormal air pressure condition in a tire may be present typically fall into two categories: direct air pressure detection and indirect air pressure detection. Regarding the first category, direct air pressure detection methods typically involve the use of air pressure detectors within each individual tire which transmit a sensor signal to a receiving unit for processing and interpretation. An example of such a direct air pressure detection system can be found in the U.S. Pat. No. 5,741,966 issued to Handfield et al. which teaches tire pressure monitoring systems in which pressure detection units are disposed within the tire and which sends signals relating to the tire conditions, over an electromagnetic path, to a central receiver unit. Although this system may be adequate for its intended uses despite certain inefficiencies, the fact that signals are sent to the central receiver unit via an electromagnetic path makes this system susceptible to erroneous readings when used on a trailer due to the fact that trailers are often equipped with electric brakes which also generate magnetic fields.

With reference now to the second category, indirect air pressure detection methods typically measure the rotational speed of each tire and compare it with the rotational speed of the remaining measured tires. The theory motivating indirect pressure measurement being that upon losing air pressure, a tire's effective outer diameter decreases, which results in a corresponding increase in the rotational speed of the wheel in order to "keep up" with the land speed of the vehicle. Upon detecting a tire rotating at a higher speed than the remaining tires, the driver is alerted of a possible abnormal tire condition. Those systems which utilize indirect air pressure detection methods typically take advantage of existing hardware which is currently available on passenger vehicles for detecting the rotational speed of wheels. For example, many passenger vehicles are currently equipped with 4 wheel ABS (anti-lock braking system) devices and/or TRC (Traction Control) devices which utilize tire revolution detection-type devices for their respective operations. Examples of systems which utilize existing ABS or TRC hardware can be found in U.S. Pat. Nos. 5,442,331, 5,218,862, and 4,876,528 issued to, respectively, Kishimoto et al., Hurrell, II et al., and Walker et al. Although such systems also may be adequate for their respective intended uses, the fact that trailers typically are not provided with ABS or TRC hardware makes the aforementioned prior art systems unsuited for trailer applications.

Thus, the aforementioned systems and associated methods for monitoring tire pressure for passenger vehicles do not adequately address nor solve the above concerns with respect to trailers.

OBJECTS OF THE INVENTION

A primary object of the present invention is to fulfill the above-mentioned need by the provision of a trailer tire pressure monitoring system. A further primary object of the present invention is to provide such a system which is efficient, inexpensive, easy to use, and easy to install. In addition, it is a primary object of the present invention to provide such a system which can differentiate between relative changes in tire conditions due to vehicle-turning versus changes in tire conditions due to actual air pressure loss.

SUMMARY OF THE INVENTION

In accordance with a preferred embodiment of the present invention, this invention provides a low tire pressure alarm system for sensing abnormal rotational speeds of a plurality of wheels on a trailer adapted for coupling to a tow vehicle comprising, in combination: a plurality of target means, each such target means being constructed and arranged for mounting adjacent to each of at least two of the wheels, for providing a sensing target rotating with each of the wheels; a plurality of sensing means, each such sensing means being constructed and arranged for non-rotatable attachment to the trailer, for sensing rotations of one such target means past one such sensing means and for generating signals representing rotational speeds; a compilation means, coupled to each such sensing means, for receiving such signals from each such sensing means and for using such signals for computing and comparing rotational speeds of the wheels; and an alarm indicator means, constructed and arranged for attachment to the tow vehicle and for coupling to such compilation means, for providing an indication of an abnormal rotational speed of a wheel.

This invention also provides such system wherein the compilation means is constructed and arranged for attachment to the trailer. It also provides such system wherein the compilation means comprises a power means for assisting powering of the sensing means and the compilation means. Plus, it provides such system wherein each target means comprises a protuberance constructed and arranged to extend from one of the wheels of the trailer; and, also, wherein the protuberance comprises a mechanical fastener constructed and arranged for attachment to normally rotating parts of the wheel.

In addition, this invention provides such a low tire pressure alarm system wherein each such sensing means comprises an induction proximity sensor; and further, wherein such compilation means comprises a programmable logic controller. It also provides such system wherein the compilation means further comprises programming means for programming the programmable logic controller for counting rotations of each of a plurality of the trailer wheels within the same fixed time period in such manner as to provide less sensitivity to rotational-count differences at lower trailer speeds. Furthermore, this invention provides such system wherein the alarm indicator means comprises an alarm constructed and arranged for mounting in the tow vehicle; and, also, wherein the alarm comprises an audio alarm structured and arranged for mounting in the tow vehicle. Still further, it provides such system wherein the alarm comprises a visual light structured and arranged for mounting in the tow vehicle.

This invention also provides such system wherein such sensing means is constructed and arranged for attachment to an axle of the trailer; and, also, wherein each target means comprises a protuberance constructed and arranged to extend from one of the wheels of the trailer, the alarm indicator means comprises an alarm constructed and arranged for mounting in the tow vehicle, and each sensing means is constructed and arranged for attachment to an axle of the trailer. This invention also provides such system wherein such target means is structured and arranged for attachment to a brake drum of one of the wheels of the trailer.

In addition, this invention provides, in accordance with a preferred embodiment thereof, a low tire pressure alarm system for sensing abnormal rotational speeds of a plurality of wheels on a trailer adapted for coupling to a tow vehicle comprising, in combination: a trailer having at least two wheels; a plurality of metal targets, each such target being mounted adjacent to one of the wheels in such manner as to provide a sensing target rotating with each of the wheels; a plurality of sensors, each sensor being attached non-rotatably to such trailer in such manner as to sense rotations of one target past one sensor and to generate signals representing rotational speeds; a computer mounted on such trailer and coupled to each sensor, such computer being structured and arranged so as to receive signals from each sensor and to use such signals to compare representations of rotational speeds of the wheels; and a trailer coupler constructed and arranged to assist in system coupling of the computer to an alarm indicator within a tow vehicle of a type adapted to attach to such trailer.

Also, this invention provides such system further comprising: a tow vehicle of a type adapted to attach to such trailer; and an alarm indicator attached to such tow vehicle, such alarm indicator being constructed and arranged for coupling to the computer in such manner as to provide an indication of an abnormal rotational speed of a such wheel. It also provides such system wherein each sensor is non-rotatably attached to an axle of such trailer; and, further, wherein each sensor is a proximity sensor. This invention also provides such a system wherein each target comprises a protuberance extending from and rotatably attached with one wheel; and also, wherein each such protuberance is connected to a brake drum of one wheel. Further still, this invention provides such system further comprising a programming means for programming the computer for counting rotations of each of a plurality of wheels of the trailer within the same fixed time period in such manner as to provide less sensitivity to rotational-count differences at lower trailer speeds.

Additionally still, this invention provides a method for sensing abnormal rotational speeds of a plurality of wheels, each coupled to air-pressure-filled tires having an optimal air pressure amount, on a trailer towable by a tow vehicle traveling at a land speed, and alerting a driver of the tow vehicle of the abnormal condition, comprising the steps of: providing one proximity sensor for each of the wheels; detecting the rotation of each wheel by means of the operation of proximity sensors; computer-storing data associated with such rotations of each respective wheel for a selected time period; computer-calculating the difference between the number of rotations of at least two wheels in such time period; and producing a warning signal in the tow vehicle when the above described differential achieves a selected value. Further, this invention provides such method wherein such warning signal is indicated when the value of such difference is at least 3 within a 10-second period.

The invention also provides such method wherein the production of the warning signal becomes less sensitive at progressively decreasing land speeds, whereby the difference in rotational speeds of the wheels on opposed sides of the trailer while the trailer is merely turning does not produce a warning signal.

In addition, this invention also provides a method of installing a low tire pressure alarm system for sensing abnormal rotational speeds of a plurality of wheels on a trailer adapted for coupling to a tow vehicle, comprising the steps of: providing a plurality of metal targets and a trailer having at least two wheels; preparing each such wheel with first attachment means for attaching a target to each wheel in such manner that the target rotates with the wheel; mounting each target on a wheel in such manner as to provide a sensing target rotating with the wheel; providing a plurality of proximity sensors; preparing an axle area adjacent each wheel with a second attachment means for attaching one proximity sensor; mounting each proximity sensor non-rotatably to the trailer in such manner as to sense rotations of one target past one proximity sensor and to generate signals representing rotational speeds of the wheel; providing a computer structured and arranged so as to receive signals from each proximity sensor and to use such signals to compare representations of rotational speeds of the wheels; mounting the computer on the trailer and coupling the computer to each proximity sensor; and mounting on the trailer a trailer coupler constructed and arranged to assist in system coupling of the computer to an alarm indicator within a tow vehicle of a type adapted to attach to a trailer. In addition, this invention provides such method further comprising the steps of: providing a tow vehicle of a type adapted to attach to a trailer; providing an alarm indicator constructed and arranged for coupling to a computer in such manner as to provide an indication of an abnormal rotational speed of a wheel; and mounting an alarm indicator within a cab of such tow vehicle. It also provides such method wherein each proximity sensor is non-rotatably attached to an axle of such trailer; as well as wherein each target comprises a protuberance extending from and rotatably attached with one wheel. It further provides such method wherein each protuberance is connected to a brake drum of one wheel, and wherein the computer does such comparing essentially by counting differences in number of rotations of each wheel; and, also, further comprising the step of using a programming means for programming the computer for counting rotations of such wheels of such trailer within the same fixed time period in such manner as to provide less sensitivity to rotational-count differences at lower trailer speeds.

BRIEF DESCRIPTION OF THE DRAWINGS

FIG. 2 is an elevation view, in partial cross-section, illustrating an preferred arrangement of the sensors and targets.

FIG. 4A is a detail view taken from FIG. 1 (area 4), in partial elevation, illustrating a preferred mounting arrangement for the sensors and targets.

FIG. 4B is a partial cross-sectional view, taken through section 4B—4B of FIG. 4A, illustrating the separation distance between the sensor and target.

FIG. 4C is an exploded perspective view, in partial cross-section, illustrating the components comprising the sensor mounting assembly.

FIG. 4D is a partial elevation view, taken through section 4D—4D of FIG. 4A, illustrating the sensor mounting assembly as attached to an axle.

FIG. 5 is a detail view taken from FIG. 1 (area 5), in partial cross section, illustrating a preferred mounting arrangement for the module under the tow vehicle's dashboard.

FIG. 6 is a detail view taken from FIG. 1 (area 6), in partial perspective, illustrating a preferred arrangement for coupling the programmable circuit wiring to the tow vehicle.

FIG. 7 is a detail view taken from FIG. 1 (area 7), in partial perspective, illustrating a preferred mounting arrangement for the programmable logic controller (PLC) within the trailer.

FIG. 8A is a side elevation view showing an alternate preferred attachment arrangement for attaching the target to the brake drum.

FIG. 8B is a detail view, taken from FIG. 8A, showing the relative locations of the target and sensor.

FIG. 8C is a perspective view illustrating a clamp for use in attaching the target to the brake drum in accordance with the alternate preferred attachment arrangement of FIG. 8A.

FIG. 9 is a perspective view illustrating the use of a Hand Held Programmer for programming the programmable logic controller.

FIG. 10 is a graph illustrating a typical example "alarm curve" for a 16-inch wheel with attached 30-inch tire and showing the variable sensitivity of the monitoring system for various tire conditions and land speeds.

DETAILED DESCRIPTION OF A PREFERRED EMBODIMENT AND THE BEST MODE OF PRACTICE

Figure 1:
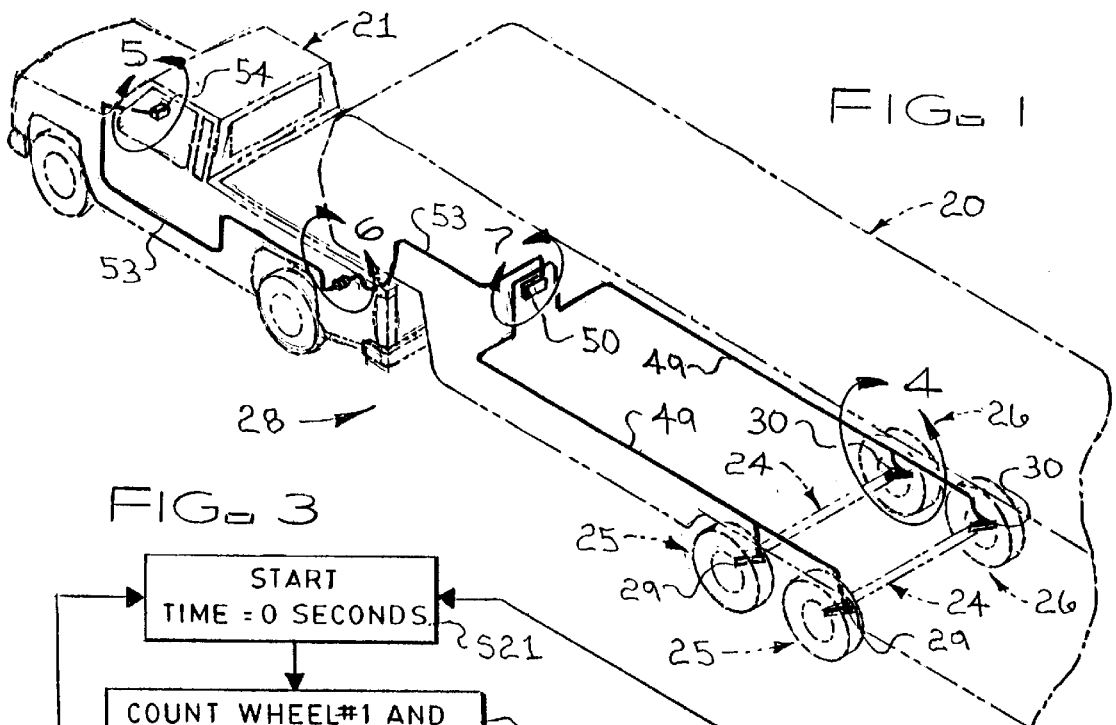
FIG. 1 is a perspective view illustrating a preferred embodiment of the of the trailer tire pressure-monitoring system of the present invention as installed on a trailer-tow vehicle combination.

Referring now to the Figures, shown in perspective (in dotted lines) in FIG. 1 is a trailer 20 coupled, in well-known ways, to tow vehicle 21. For example purposes only, trailer 20 is shown comprising a dual-axle arrangement with the arrangement shown being embodied by axles 24 having attached left and right wheel arrangements 25 and 26, respectively. Although a dual-axle arrangement is shown, it is to be understood that the trailer tire pressure-monitoring system (herein monitoring system 28) of the present invention may be effectively used with those trailers 20 comprising axles 24 numbering one or more. As will be appreciated by those skilled in such art, the monitoring system 28 of the present invention effectively ascertains when an abnormal tire condition is present on the trailer 20 and alerts the driver of this condition while there is time to correct the condition prior to catastrophic failure.

Though the details of the monitoring system 28 of the present invention will be discussed more fully as this disclosure progresses, it is noted for now that the monitoring system 28 comprises at least one left-side sensor 29 and at least one right-side sensor 30, with each of the sensors 29 and 30 being preferably mounted to the trailer 20 adjacent, respectively, the left wheel arrangement 25 comprising a left wheel 35, left tire 37, and a left brake drum 38 (all as shown best in FIG. 2), and the right wheel arrangement 26 comprising a right wheel 42, right tire 45, and right brake drum 46 (all as shown best in FIG. 2). Each of the respective sensors 29 and 30 are coupled, by means of sensor wiring 49, to a programmable logic controller (herein PLC 50) which processes signals obtained from the sensors 29 and 30. A PLC (like PLC 50) is a type of computer. The PLC 50 is preferably mounted in a convenient and accessible place within trailer 20 and transmits the processed information, also by means of suitable wiring 53, to module 54 which may contain, for example, the activation and reset components for the monitoring system 28 along with an audio or visual means, or both, to alert the driver of an abnormal tire condition. In the preferred embodiment described herein, the module 54 is preferably mounted within the tow vehicle 21. The details of the module 54 and PLC 50 will be discussed more fully hereinafter with respect to FIGS. 5 and 7, respectively.

Referring now to FIG. 2, shown is a preferred mounting arrangement for sensors 29 and 30. As shown, the left-side sensor 29 is mounted on the axle 24 adjacent the left brake drum 38, and the right-side sensor 30 is mounted on the axle 24 adjacent the right brake drum 46. The method of attachment of the sensors depicted in FIG. 2 and described herein, embodies herein a second attachment means for attaching a proximity sensor. Each of the respective sensors 29 and 30 preferably comprise proximity sensors, more preferably 3-wire, 30 mm 9–30 volt DC (direct current) inductive proximity sensors of the type commercially available from the Honeywell Corporation (992 series) and each having a maximum current consumption of about 15 milliamps. Applicant has discovered that the use of the inductive proximity sensors 29 and 30 of the type described herein are not susceptible to the magnetic fields generated by the electric brakes common to many trailers 20, thereby minimizing erroneous readings which the aforementioned magnetic fields may cause.

As utilized for the present invention, the sensors 29 and 30 detect and then relay to the PLC 50 rotational speed information obtained from the respective left and right wheels 35 and 42. In other words, sensors 29 and 30 generate signals representing rotational speeds of the wheels. To provide a "target" which will trigger a response from the sensors 29 and 30, left and right protuberances or sensor targets 57 and 58, respectively, are preferably provided. Sensor targets 57 and 58 each herein embody a protuberance constructed and arranged to extend from one of the wheels of the trailer. Sensor targets 57 and 58 also embody herein a target means mounted adjacent to at least two of the wheels. However, a target or target means does not necessarily require a protuberance, and may be an already existing rotating component of a wheel. A target is said to be rotatably attached to the wheel. In other words, a target (or target means) is attached to, or is part of, the wheel and rotates with the wheel. Thus, sensor targets 57 and 58 each herein embody a sensing target rotating with said wheel. In the preferred embodiment, the targets 57 and 58 preferably comprise 8–32, 1¼-inch stainless steel socket head bolts which are preferably attached to the inside rim 61 of each respective brake drum 38 and 46 (as shown best in FIG. 4B). Attachment of the targets 57 and 58 to each respective inside rim 61 is preferably accomplished by tapping a suitably sized opening in each inside rim 61 for threadably receiving, in well-known ways, a respective target 57 and 58, as shown. This method of attaching targets 57 and 58, embodies herein a first attachment means for attaching a target with a wheel in such manner that the target rotates with the wheel.

Figure 3:
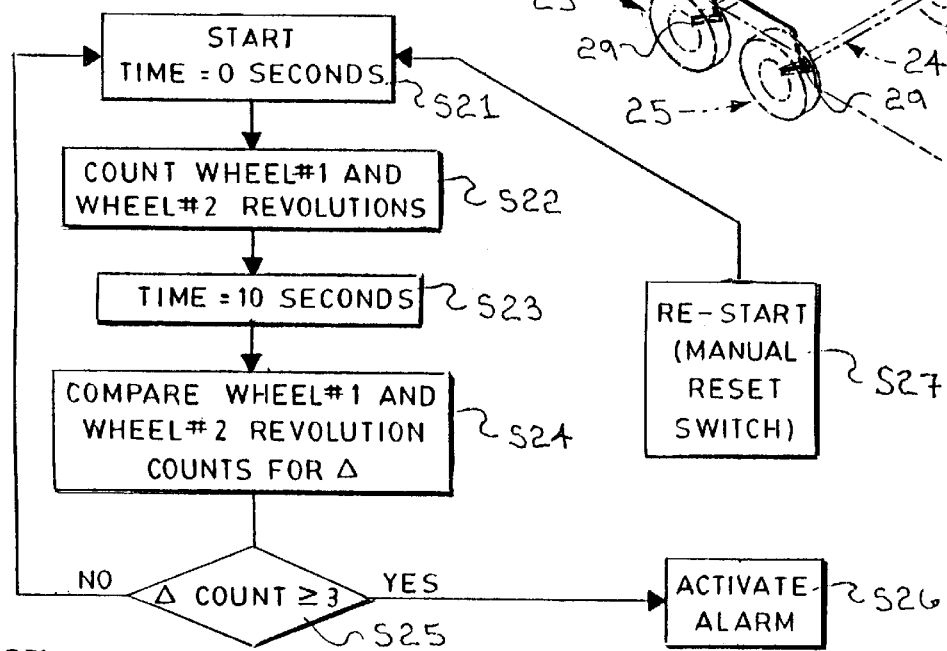
FIG. 3 is a flow chart representation which shows a preferred method of detecting and communicating an abnormal tire condition.

Referring further to FIG. 2 and introducing FIG. 3, the details of a preferred method of using the monitoring system 28 to ascertain an abnormal tire condition—and alerting the vehicle driver of such abnormal condition—will now be discussed. For example purposes only, the preferred method described herein is shown practiced with a single axle 24, though it is to be understood that such a showing is an example only and the preferred disclosed method may be practiced, with reference to the teachings of this specification, by those with skill in the art with multiple axles 24 without undue experimentation. Shown in FIG. 2 is a partially deflated left tire 37 which, if not noticed in time, may lead to catastrophic failure of the left tire 37, possibly resulting in damage to the trailer 20; loss of control of the vehicle; injury to the driver, other motorists, pedestrians, or bicyclists; or any combination of the above consequences.

In operation, rotation of each respective brake drum 38 and 46 causes a corresponding rotation of the respective targets 57 and 58 past the corresponding sensors 29 and 30. This rotation of the respective targets 57 and 58 past the corresponding sensors 29 and 30 causes sensors 29 and 30 to activate, thereby placing them in an "ON" state. Conversely, upon each respective target 57 and 58 exiting the usable sensing distance D (as shown best in FIG. 4B) of the corresponding sensors 29 and 30, the sensors 29 and 30 deactivate and return to an "OFF" state. As used herein, "usable sensing distance" is defined as the nominal distance between a respective target 57 and 58 and corresponding sensor 29 and 30 at which the sensor 29 and 30 will turn on. As, for example, the left tire 37 continues to deflate, the left wheel 35 (with coupled left brake drum 38) will rotate at a faster rate in comparison to the right wheel 42 (assuming the right tire 45 is properly inflated) causing a disparity between the number of sensed ON states of left-side sensor 29 in comparison with the right-side sensor 30.

In the preferred embodiment of the monitoring system 28 described herein, applicant has discovered that a preferred distance of about ⅛-inch between the sensors 29 and 30 and their respective corresponding targets 57 and 58 provides adequate results, and is the best gap known to the applicant. However, it is to be understood that the useable sensing distance defined herein is dependent on such factors as the material comprising the target, target size, and manufacturing tolerances for the sensors, to name a few. However, one of ordinary skill in such art, upon reviewing the manufacturer's instructions for the type of sensor used, will be able to ascertain the optimal sensing distance for a particular application without undue experimentation.

Referring now to the flow chart shown in FIG. 3, a preferred program method to detect an abnormal tire condition will now be described. With reference to block S21, upon activating the PLC 50, the PLC 50 is programmed to initiate a timed sweep beginning at time=0 seconds. With reference now to blocks S22 and S23, for each aforementioned timed sweep, the PLC 50 is preferably programmed to take a ten (10) second sampling count of signals sent to PLC 50 from the left-side sensor 29, of the rotational cycles of the left wheel 35 (for example, wheel #1) and then store the data obtained in a separate register for the left wheel 35. In a like manner, the PLC 50 (concurrently with the gathering of data as above stated for wheel #1) takes a ten (10) second sampling count of signals sent to the PLC 50 from the right-side sensor 30, of the rotational cycles of the right wheel 42 (for example, wheel #2) and stores this data in a separate data register assigned to the right wheel 42. Next, the PLC 50 compares the resulting revolutions of each respective wheel 35 and 42 for the aforementioned ten (10) second period, as shown in block S24. The sensors 29 and 30 embody herein a sensing means, being constructed and arranged for non-rotatable attachment to the trailer, for sensing rotations of one target means past one sensing means and for generating signals representing rotational speeds.

Referring to blocks S25 and S26, in the preferred embodiment, if the revolution differential between the respective wheels 35 and 42 is greater than or equal to three (3), the PLC 50 is instructed, by the programmed logic, to activate an alarm (either audio or a visual alarm light 62, as shown best in FIG. 5) which is part of the module 54 located within tow vehicle 21. As represented in block S27, upon airing or replacing the left tire 37, the driver toggles a reset switch 65 (shown best in FIG. 5), also comprising a component of module 54, which extinguishes the alarm light 62 and resets the aforementioned timed sweep at time=0 seconds. However, if the aforementioned revolution differential between the respective wheels 35 and 42 is less than 3, the aforementioned timed sweep is continuously repeated for the aforementioned ten (10) second periods. The herein described method embodies herein a method comprising the steps of: providing one proximity sensor for each of the wheels; detecting each rotation of each wheel by such proximity sensors; computer-storing data associated with such rotations of each such respective wheel for a selected time period; computer-calculating the differential between the number of rotations of at least two wheels; and producing a warning signal when such differential achieves a selected value. The herein described method herein embodies a method for counting rotations of each of a plurality of the trailer wheels within the same fixed time period in such manner as to provide less sensitivity to rotational-count differences at lower trailer speeds. In other words, the method described herein embodies such computer comparing essentially by counting differences in number of rotations of each said wheel.

As will be appreciated by those skilled in such art, the PLC 50 of the type described herein may be programmed in a number of ways in order to perform the aforementioned comparisons of the revolutions of the wheels 35 and 42. For those trailers 20 comprising multiple axles 24, the PLC 50 may be programmed to randomly compare the rotational information contained in a data register for a given wheel with rotational data register information for any other wheel. Alternatively, the PLC 50 may be programed to perform an averaging algorithm of the data registers of all the wheels and compare each wheel to that average. The details regarding the steps of programming the PLC 50 will be discussed more fully herein with respect to FIG. 9. The PLC 50 embodies herein a compilation means, coupled to such sensing means, for receiving such signals from such sensing means and for using such signals for computing and comparing such rotations of the wheels. The PLC 50 also embodies a compilation means, coupled to each sensing means, for receiving signals from each sensing means and for using signals for computing and comparing rotational speeds of the wheels.

Shown in FIGS. 4A–4D is a preferred of attaching each respective sensor 29 and 30 to axle 24. For example purposes only, attachment of the left-side sensor 29 will only be discussed herein, though it is to be understood that the attachment of the right-side sensor 30 is accomplished in a substantially similar manner. The left-side sensor 29 is preferably attached adjacent to the axle end 66 between the axle flange 69 and any potential axle support or suspension structure 70 such as a leaf spring 73, as shown best in FIGS. 2 and 4B. Actual attachment of the left-side sensor 29 to the axle 24 is accomplished by means of a sensor attachment assembly 74, preferably comprising a U-clamp 77 with attachable base member 78, both of a well-known type and readily selectable by those skilled in such art to match the diameter of the particular axle 24 encountered. The base member 78, in turn, is provided, in a well-known manner, with a pair of apertures (not shown) for receiving the threaded leg portions 79 of U-clamp 77.

Attached to the bottom 81 of base member 78 is a sensor support bracket 82, preferably comprising about a 3/32-inch thick rigid and durable material, preferably aluminum, which is used to maintain the left-side sensor 29 in a fixed, static relationship with respect to the left brake drum 38. As shown, the sensor support bracket 82 in the preferred embodiment comprises a planar portion 85 having a plurality of apertures 86 for receiving the threaded leg portions 79 of U-clamp 77. The sensor support bracket 82 further comprises an end portion 90 also having an aperture 93 sized to receive the sensor body 94. Depending on such factors as the size of the axle 24, the end portion 90 may be required to form an angle $\phi$ relative to the plane defined by the planar portion 85, as shown in FIG. 4A. It is preferred that such angle $\phi$ be provided which orients the longitudinal axis LA of the left-side sensor 29 in such a manner that the longitudinal axis LA bisects the arc formed by the sweep of the left target 57 at approximately a right angle (shown best in FIG. 4A).

Referring further to FIGS. 4A–4D, the sensor support bracket 82 is secured adjacent the bottom 81 of the base member 78 by use of two threaded nuts 98 which, in turn, threadably engage, in well-known ways, the threaded leg portions 79 of U-clamp 77. Likewise, each of the sensors 29 and 30 of the type described herein also comprise a threaded end portion 101 for threadably receiving two adjustment nuts 102 which are used to secure, for example, the left-side sensor 29 to the sensor support bracket 82. As should be apparent to those skilled in such art, the adjustment nuts 102 may be used to adjust the aforementioned usable sensing distance D. Such adjustments are accomplished in a well-known manner and consist of, for an example: loosening the one respective adjustment nut 102 whose location, relative to the body 94, needs to be adjusted, rotating the adjustment nut 102 until it is at the desired location along the body 94, sliding the body 94 through aperture 93 until the end portion 90 abuts the adjusted nut, and then tightening both adjustment nuts against the end portion 90.

It is to be understood that the dimensions of the sensor support bracket 82 may be readily selected by those skilled in such art depending on such factors as the dimensions of the relevant components involved, such as, for example, the diameters of the left brake drum 38 and of the axle 24, to name some such relevant factors. Regardless of the above constraints, the longitudinal length of the sensor support bracket 82 should be chosen so as to afford a sufficient distance between the end portion 90 and the base member 78 in order to accommodate the sensor wiring 49, as shown best in FIG. 4A.

With reference now to FIG. 5, the details of the module 54 will now be discussed. The module 54 preferably comprises (1) a plastic or (2) a sturdy material such as steel, aluminum, or the like (formed, in well-known metal bending ways, into an L-shaped member, as shown). The module 54 comprises a front wall portion 105 on which may be mounted, in well-known ways, such items as the PLC on/off switch 106, a reset button 65 to reset the PLC 50 program, and an alarm light 62 (embodying herein an alarm indicator means, constructed and arranged for attachment to the tow vehicle and for coupling to the compilation means, for providing an indication of an abnormal rotational speed of a wheel) to provide the driver with an indication of an abnormal tire condition. "Abnormal" as used herein means the number or count of revolution difference between, e.g., wheel #1 and wheel #2, as programmed for alarm, e.g., in the preferred embodiment a count difference of at least 3 (as hereinbefore discussed in detail). Thus, abnormal rotational speeds are any speeds sufficiently different than the rotational speeds of other wheels to indicate a significant difference in tire pressure. As shown, the module 54 is attached, preferably removably, to the under portion 110 of the vehicle dashboard 111. The ability of the module 54 to be removed is preferably accomplished by means of well-known hook-and-loop type fasteners comprising a loop portion 115 and a hook portion 116. As is further shown in FIG. 5, the loop portion 115, for example, may be attached, preferably adhesively, to the top surface 119 of module 54. Likewise, the hook portion 116 may be attached, preferably adhesively, to the under portion 110 of the vehicle's dashboard 111. The PLC on/off switch 106, reset button 65, and alarm light 62 are coupled, in well-known ways, to the tow vehicle's 21 power supply (not shown) via power lead 120, and to the PLC 50 via suitable electric wiring 53. A ground wire 121 and a fuse 124, preferably a 2 amp fuse incorporated into the power lead 120, may also be used.

Shown in perspective, in partial cut-away, in FIG. 6 is a preferred arrangement for coupling the electrical wiring 53 from the PLC 50 in the trailer 20 to the electrical wiring 53 connecting to those components found in the tow vehicle 21, such as the tow vehicle power supply (not shown) and module 54. To conveniently detach the electrical wiring 53 from the tow vehicle 21, it is preferred that the tow vehicle 21 be provided with an electrical umbilical connector 125, of a well-known type and which is attached in a well-known manner, to the tow vehicle body 127, as shown. As will be appreciated by those skilled in such art, the umbilical connector 125 of the type described herein allows for quick coupling/uncoupling of the PLC 50 and other electrical components such as, for example, trailer lights and electric trailer brakes (neither shown) which may require the tow vehicle's power source (not shown) for their power. As shown, the user may desire to have a single umbilical connector 125 for coupling the electrical wiring 53 together, and a second umbilical connector 128 for connecting the electrical wiring 129 for the aforementioned trailer electrical components such as lights and brakes to the tow vehicle's 21 power supply. Umbilical connector 125, electrical wiring 53, second umbilical connector 128, and electrical wiring 129, alone or in any combination thereof, herein embody a trailer coupler.

Shown in perspective, in partial cut-away, in FIG. 7 is a preferred mounting arrangement of the PLC 50 within the trailer 20. Prior to describing the details of the aforementioned preferred mounting arrangement, the specific details of the PLC 50 should now be discussed. The PLC 50 of the type disclosed herein preferably comprises a Series 90(™)

14-Point Micro PLC of the type commercially available from GE Fanuc Automation North America, Inc., Charlottesville, Va. (catalog No. IC693UDR002). The herein described PLC 50 operates on a 12–24 VDC (volts direct current) input power and includes an internal central processing unit (CPU) as well as input/output (I/O) and power supply functions. The internal power supply (not shown) of PLC 50 comprises a 24 VDC power supply used to provide power to the various input and output devices comprising the monitoring system 28 such as, for example, sensors 29 and 30 and alarm light 62. The internal power supply (along with the tow vehicle's 21 power supply) embodies herein a power means for powering such sensing means, such compilation means, and such signal means. In addition, the PLC 50 comprises eight logic input circuits and six relay output circuits.

The arrangement of field wiring the PLC 50 to the various I/O devices comprising the herein described monitoring system 28 will depend on such factors as number of sensors (e.g., 29 and 30), additional/fewer components comprising the module 54 than those aforementioned, etc. However, any such modifications to the field wiring of the PLC 50 to accommodate, for example, the aforementioned factors will be apparent to those skilled in such art and will not be further discussed in detail herein. Rather, applicant incorporates herein by reference the *Series 90*(™) *Micro PLC User's Manual* associated with the herein described PLC 50, published by GE Fanuc Automation North America, Inc., Charlottesville, Va. (Copyright 1994–1997) for further instruction.

Referring further to FIG. 7, the PLC 50 of the type described herein is a compact unit having dimensions of about 3⅕ inches×3 inches×4½ inches, which allows the PLC 50 to be placed in a convenient and out-of-the-way location in either the trailer 20 or tow vehicle 21. As shown in FIG. 7, the PLC 50 is preferably mounted to an upright wall 132 found in the trailer 20. The PLC 50 described herein is provided with a channel 133 sized to receive, in a well-known manner, a DIN rail 136, preferably a 35 mm DIN rail. The DIN rail 136, in turn, is attached to the upright wall 132 by use of fasteners 137, preferably threaded fasteners. Also shown is the PLC 50 coupled to the sensor wiring 49 and the electric wiring 53 for the various components contained in the module 54, tow vehicle 21 power source, etc. Again, the specific manner in which the PLC 50 is field wired will be apparent to those skilled in such art without undue experimentation and will depend on a number of factors such as, for example, the various I/O devices the user desires, the number of sensors 29 and 30, etc.

With reference now to FIGS. 8A and 8B, the details of an alternate preferred arrangement of attaching the targets (e.g., 57 and 58) to a respective brake drum (e.g., 38 and 46) will be discussed. For example purposes only, the herein alternate preferred attachment arrangement will be shown and described as being practiced on the left brake drum 38 though it is to be understood that the herein disclosed will be substantially the same for the other similarly arranged brake drums (e.g., the right brake drum 46). Thus, shown in FIGS. 8A and 8B is the left brake drum 38 in which a dust cover 140 is provided. For those trailers 20 utilizing dust covers 140 of the type described herein, the dust cover 140 typically is sized and arranged to substantially overlay the inside rim 61 (as shown best in FIG. 8B), thereby substantially preventing the aforementioned disclosed preferred attachment location of the targets 57 and 58 to the inside rim 61 (as in, e.g. FIG. 4B).

For these arrangements using a dust cover 140, the alternate preferred described herein utilizes a band 141, preferably an adjustable band of a well-known type and preferably made of rigid and durable material such as, for example, a metal material, nylon, or the like, and which is preferably attached to the outer periphery 144 of, for example, the shown left brake drum 38. A support 145, preferably made of a rigid material such as metal, is attached, preferably integrally, to the band 141. The support 145 is provided with a threaded aperture 148 sized to threadably receive, for example, left target 57 as shown. With reference to FIG. 8C, the band 141 of the type described herein is typically adjusted by use of a flat head screwdriver (not shown) to rotate screw 149. The screw 149, in turn, is structured and arranged to engage slots 150 formed on the band body 153. Attachment of the band 141 to the axle 24 may be accomplished, for example, by progressively turning the screw 149 in such a manner as to cause retraction of the band end 154 from the screw housing 155. The band 141 can then be placed around, for example, the left brake drum 38 and the band end 154 reinserted into the screw housing 155 and the band 141 tightened against, for example, the left brake drum 38 by turning the screw 149, in well-known ways.

As shown in the detailed view of FIG. 8B, it is preferred that the band 141 be placed on, for example, the left brake drum 38 in such manner as to position the target head 57a approximately along the longitudinal axis LA (as shown in FIG. 4A) of sensor body 94, yet with target 57 far enough way from the dust cover 140 so as to avoid any potentially damaging contact between the support 145 and dust cover 140. For this alternate preferred attachment arrangement described herein, attachment of the sensors 29 and 30 to the axle 24 is as substantially illustrated and described previously with respect to FIGS. 4A–4D and will not be discussed in any greater detail herein.

Referring now to FIG. 9, shown is the PLC 50 of the type described herein being programmed by use of a Hand-Held Programmer (herein HHP 159) also commercially available from GE Fanuc Automation North America, Inc., Charlottesville, Va. (catalog No. IC693PRG300). To assist in programming, the PLC 50 of the type described herein is provided with a serial port 162 comprising a 15-pin D-type, female connector which is structured and arranged to support those protocols used with the herein described PLC 50 such as the SNP and SNPX protocols as well as RTU Slave protocols. The HHP 159 and PLC 50 are coupled via a cable 163, also commercially available from GE Fanuc Automation North America, Inc. (catalog No. IC693CBL303), which comprises two 15-pin male D connector ends 166 with one such end 166 adapted to interface, in well-known ways, with the serial port 162, and the other such end 166 adapted to interface, in well-known ways, with the HHP 159.

Alternatively, the PLC 50 may be programed using an MS-DOS compatible personal computer (not shown) having a 386 or higher microprocessor and at least 2 MB memory. It is noted that Logicmaster(™) 90-30/20 Micro software, also available from the GE Fanuc Automation North America, Inc., will be required in order to program the PLC 50 using a personal computer. The specific details regarding the various steps of programming the PLC 50 using either the HHP 159 or a personal computer should be apparent to those skilled in such art and will not be elaborated on herein. Rather, applicant again incorporates herein by reference the *Series 90*(™) *Micro PLC User's Manual* associated with the herein described PLC 50 for the specific programming s. The HHP 159 and the personal computer described above each herein embody a programming means for programming the PLC (computer).

FIG. 10 illustrates a representative "alarm curve" chart generated for a trailer 20 having 16-inch diameter wheels 35 and 42 with 30-inch diameter tires 37 and 45. As shown, the left side of the chart represents the effective diameter of the tire (with 30 inches being the baseline tire diameter when tire's air pressure is at the optimal, properly inflated level). The right side of the chart represents the amount the tire has gone flat (in inches). For example, a flat of 1.5 inches represents a decrease in tire diameter of 3 inches yielding an effective tire diameter of 27 inches which would cause the effective wheel to rotate at a faster rate in comparison to the non-affected wheels (e.g., the rotational speed of the wheels is directly related to the air pressure within the tires). As is further shown, the bottom portion of the curve represents the land speed of the trailer 20. All points falling upon the generated curve 169 represents that land speed of the trailer 20, relative to the effective tire diameter, which will signal the alarm light 62 that a potentially dangerous tire condition exists (for the herein preferred alarm setting of at least three counts difference in a ten-second interval, previously discussed). All points falling below curve 169 will not trigger an alarm response; and all points falling above curve 169, representing more of a "flat", will trigger such alarm. As used herein, "land speed" refers to the speed at which the trailer 20 is moving along the ground when towed by the tow vehicle 21.

As will be appreciated by those skilled in such art, the programed asymptotical relationship (e.g., curve 169) between the effective tire diameter and the land speed yields a reduced sensitivity of the monitoring system 28 at lower land speeds, thereby allowing the monitoring system 28 to differentiate between those changes in tire diameters due to turning versus similar changes resulting from an actual loss in tire pressure (e.g., embodying herein such system wherein at progressively decreasing land speeds, such warning light is produced at air pressure amounts decreasing from such optimal level). Likewise, the monitoring system's higher sensitivity at higher speeds will likewise be appreciated by those skilled in such art due to the fact that tire failure at higher speeds results in an increased probability of more severe damage and/or injury (e.g., embodying herein such system wherein at progressively increased land speeds, such warning signal is produced at air pressure amounts approaching such optimal level). It should be understood that the "alarm curve" disclosed herein is an example of one possible generated curve for a particular wheel/tire diameter, and that programming the desired sensitivity parameters into the PLC 50 should be apparent to those skilled in such art without undue experimentation.

Although applicant has described applicant's preferred embodiment of this invention, it will be understood that the broadest scope of this invention includes such modifications as diverse shapes, sizes, and materials. Such scope is limited only by the claims as read in connection with the above specification. Further, many other advantages of applicant's invention will be apparent to those skilled in the art from the above descriptions and the below claims.

What is claimed is:

1. A low tire pressure alarm system for sensing abnormal rotational speeds of a plurality of wheels on a trailer adapted for coupling to a tow vehicle comprising, in combination:
   a) a plurality of target means, each said target means being constructed and arranged for mounting adjacent to each of at least two of the wheels, for providing a sensing target rotating with each of the wheels;
   b) a plurality of sensing means, each said sensing means being constructed and arranged for non-rotatable attachment to the trailer, for sensing rotations of one said target means past one said sensing means and for generating signals directly representing rotational speeds;
   c) a compilation means, coupled to each said sensing means, for receiving said signals directly representing rotational speeds from each said sensing means and for using said signals for computing and comparing rotational speeds of the wheels; and
   d) alarm indicator means, constructed and arranged for attachment to the tow vehicle and for coupling to said compilation means, for providing an indication of an abnormal rotational speed of a wheel.

2. The system of claim 1 wherein said compilation means is constructed and arranged for attachment to the trailer.

3. The system of claim 2 wherein said compilation means comprises a power means for assisting powering of said sensing means and said compilation means.

4. The system of claim 3 wherein said compilation means comprises a programmable logic controller.

5. The system of claim 4 wherein said compilation means further comprises programming means for programming said programmable logic controller for counting rotations of each of a plurality of the trailer wheels within the same fixed time period in such manner as to provide less sensitivity to rotational-count differences at lower trailer speeds.

6. The system of claim 5 wherein:
   (a) each said target means comprises a protuberance constructed and arranged to extend from one of the wheels of the trailer;
   (b) said alarm indicator means comprises an alarm constructed and arranged for mounting in the tow vehicle; and
   (c) each said sensing means is constructed and arranged for attachment to an axle of the trailer.

7. The system of claim 6 wherein said target means is structured and arranged for attachment to a brake drum of one of the wheels of the trailer.

8. The system of claim 1 wherein each said target means comprises a protuberance constructed and arranged to extend from one of the wheels of the trailer.

9. The system of claim 8 wherein said protuberance comprises a mechanical fastener constructed and arranged for attachment to normally rotating parts of the wheel.

10. The system of claim 1 wherein each said sensing means comprises an induction proximity sensor.

11. The system of claim 1 wherein said alarm indicator means comprises an alarm constructed and arranged for mounting in the tow vehicle.

12. The system of claim 11 wherein said alarm comprises an audio alarm structured and arranged for mounting in the tow vehicle.

13. The system of claim 11 wherein said alarm comprises a visual light structured and arranged for mounting in the tow vehicle.

14. The system of claim 1 wherein said sensing means is constructed and arranged for attachment to an axle of the trailer.

15. A low tire pressure alarm system for sensing abnormal rotational speeds of a plurality of wheels on a trailer adapted for coupling to a tow vehicle comprising, in combination:
   a) a trailer having at least two wheels;
   b) a plurality of metal targets, each said target being mounted adjacent to one of said wheels in such manner as to provide a sensing target rotating with each of said wheels;

c) a plurality of sensors, each said sensor being attached non-rotatably to said trailer in such manner as to sense rotations of one said target past one said sensor and to generate signals directly representing rotational speeds;

d) a computer mounted on said trailer and coupled to each said sensor, said computer being structured and arranged so as to receive said signals directly representing rotational speeds from each said sensor and to use said signals to compare said direct representations of rotational speeds of said wheels; and e) a trailer coupler constructed and arranged to assist in system coupling of said computer to an alarm indicator within a tow vehicle of a type adapted to attach to said trailer.

16. The system of claim 15 further comprising:

(a) a tow vehicle of a type adapted to attach to said trailer; and (b) an alarm indicator attached to said tow vehicle, said alarm indicator being constructed and arranged for coupling to said computer in such manner as to provide an indication of an abnormal rotational speed of a said wheel.

17. The system of claim 15 wherein each said sensor is non-rotatably attached to an axle of said trailer.

18. The system of claim 17 wherein each said sensor is a proximity sensor.

19. The system of claim 18 wherein each said target comprises a protuberance extending from and rotatably attached with one said wheel.

20. The system of claim 19 wherein each said protuberance is connected to a brake drum of one said wheel.

21. The system of claim 15 further comprising a programming means for programming said computer for counting rotations of each of a plurality of said wheels of said trailer within the same fixed time period in such manner as to provide less sensitivity to rotational-count differences at lower trailer speeds.

22. A method for sensing abnormal rotational speeds of a plurality of wheels, each coupled to air-pressure-filled tires having an optimal air pressure amount, on a trailer towable by a tow vehicle traveling at a land speed, and alerting a driver of the tow vehicle of the abnormal condition, comprising the steps of:

a) providing one proximity sensor for each of said wheels;

b) detecting each rotation of each said wheel by means of the operation of each said proximity sensor;

c) computer-storing data directly associated with said rotations of each said respective wheel for a selected time period;

d) computer-calculating the difference between the number of rotations of at least two said wheels in said time period; and e) producing a warning signal in said tow vehicle when said differential achieves a selected value.

23. The method of claim 22 wherein said warning signal is indicated when the value of said difference is at least 3 within a 10-second period.

24. The method of claim 22 wherein said production of said warning signal becomes less sensitive at progressively decreasing land speeds, whereby the difference in rotational speeds of said wheels on opposed sides of said trailer while said trailer is merely turning does not produce a said warning signal.

25. A method of installing a low tire pressure alarm system for sensing abnormal rotational speeds of a plurality of wheels on a trailer adapted for coupling to a tow vehicle, comprising the steps of:

a) providing a plurality of metal targets and a trailer having at least two wheels;

b) preparing each said wheel with first attachment means for attaching one said target with said wheel in such manner that said target rotates with said wheel;

c) mounting each said target on one said wheel in such manner as to provide a sensing target rotating with said wheel;

d) providing a plurality of proximity sensors;

e) preparing an axle area adjacent each said wheel with a second attachment means for attaching one said proximity sensor;

f) mounting each said proximity sensor non-rotatably to said trailer in such manner as to sense rotations of one said target past one said proximity sensor and to generate signals directly representing rotational speeds of said wheel;

g) providing a computer structured and arranged so as to receive said signals from each said proximity sensor and to use said signals to compare said representations of rotational speeds of said wheels;

h) mounting said computer on said trailer and coupling said computer to each said proximity sensor; and i) mounting on said trailer a trailer coupler constructed and arranged to assist in system coupling of said computer to an alarm indicator within a tow vehicle of a type adapted to attach to said trailer.

26. The method of claim 25 further comprising the steps of:

(a) providing a tow vehicle of a type adapted to attach to said trailer;

(b) providing an alarm indicator constructed and arranged for coupling to said computer in such manner as to provide an indication of an abnormal rotational speed of a said wheel; and (c) mounting said alarm indicator within a cab of said tow vehicle.

27. The method of claim 25 wherein each said proximity sensor is non-rotatably attached to an axle of said trailer.

28. The method of claim 25 wherein each said target comprises a protuberance extending from and rotatably attached with one said wheel.

29. The method of claim 28 wherein each said protuberance is connected to a brake drum of said one wheel.

30. The method of claim 25 wherein said computer does said comparing essentially by counting differences in number of rotations of each said wheel.

31. The method of claim 30 further comprising the step of:

(a) using a programming means for programming said computer for counting rotations of said wheels of said trailer within the same fixed time period in such manner as to provide less sensitivity to rotational-count differences at lower trailer speeds.

* * * * *